United States Patent [19]
Valentine et al.

[11] Patent Number: 5,206,513
[45] Date of Patent: Apr. 27, 1993

[54] EXTENDED RANGE GEIGER COUNTING APPARATUS AND METHOD UTILIZING A SINGLE GEIGER-MUELLER TUBE

[75] Inventors: Kenneth H. Valentine, Del Mar; John M. Wettroth, San Diego, both of Calif.

[73] Assignee: Science Applications International Corporation, San Diego, Calif.

[21] Appl. No.: 553,208

[22] Filed: Jul. 13, 1990

[51] Int. Cl.$^5$ ............................................... G01T 1/18
[52] U.S. Cl. ...................................... 250/374; 250/375
[58] Field of Search ............... 250/374, 375, 376, 377, 250/378

[56] References Cited
U.S. PATENT DOCUMENTS

| | | |
|---|---|---|
| 4,090,082 | 5/1978 | Marshall, III et al. ............. 250/375 |
| 4,605,859 | 8/1986 | Di Ianni et al. ..................... 250/374 |
| 4,631,411 | 12/1986 | Noback ................................ 250/374 |

Primary Examiner—Carolyn E. Fields
Attorney, Agent, or Firm—Fitch, Even, Tabin & Flannery

[57] ABSTRACT

A radiation measurement apparatus and method extends the measurement range of a single Geiger Mueller tube (GMT). The apparatus may operate in a either a conventional mode, used to measure low radiation levels, e.g. background radiation, or an extended range geiger (ERG) mode, used to measure high radiation levels. Both modes utilize the same GMT and basic operating circuitry, including a power supply for generating a GMT anode voltage, a GMT anode voltage control circuit, a GMT trigger circuit, a clock circuit, and a GMT pulse counter circuit. In the conventional mode, the radiation rate is determined as a function of the number of GMT pulses counted over a prescribed time period. In the ERG mode, an additional counter is employed to count trial intervals of a prescribed duration. The radiation rate is determined in the ERG mode statistically as a function of the ratio of the GMT pulse count and the trial interval count, with a prescribed number of trial interval counts being rejected after each GMT pulse in order to assure known initial conditions.

27 Claims, 6 Drawing Sheets

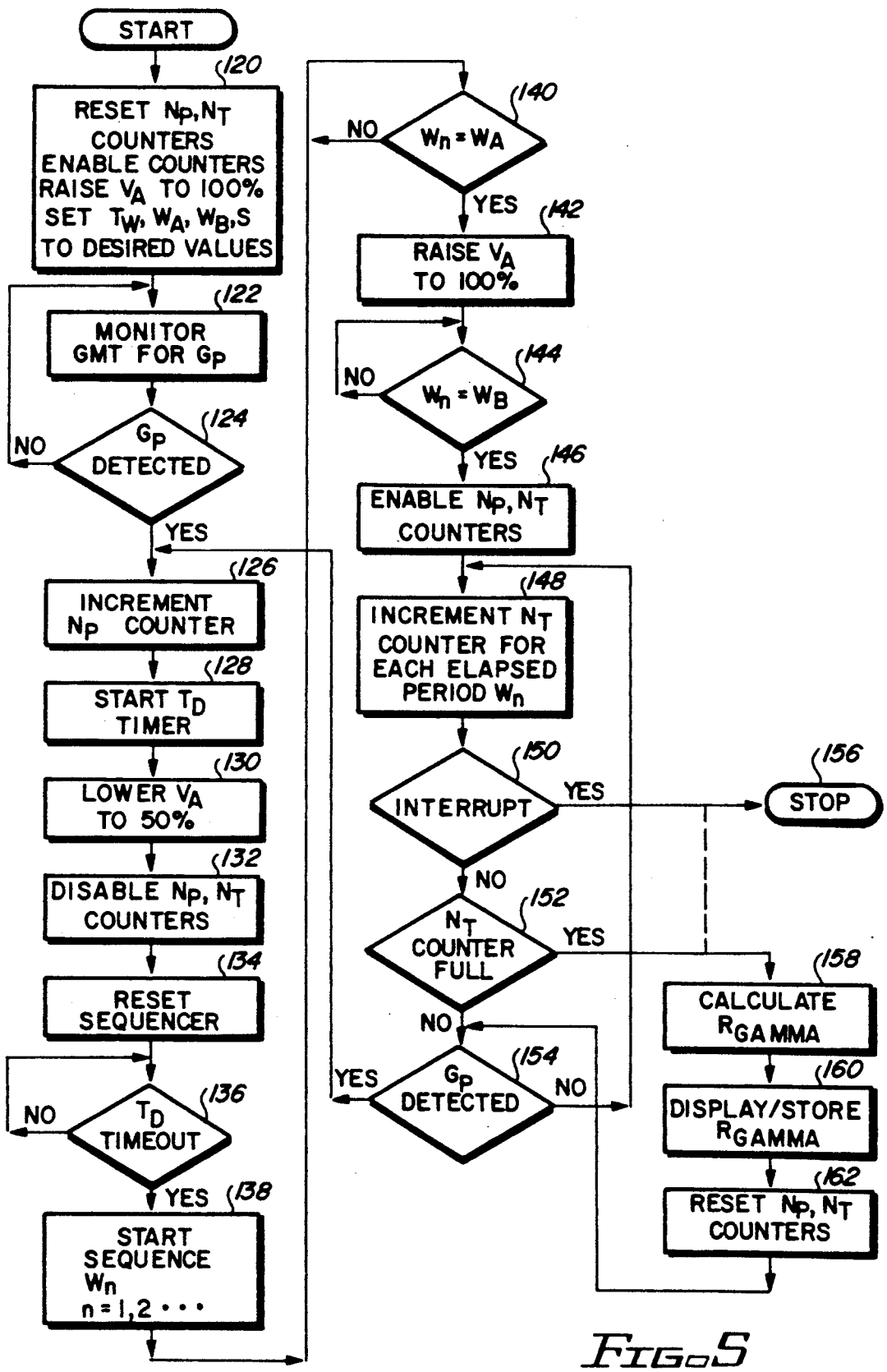

EXTENDED RANGE GEIGER COUNTING APPARATUS AND METHOD UTILIZING A SINGLE GEIGER-MUELLER TUBE

BACKGROUND OF THE INVENTION

The present invention relates to radiation measuring apparatus and methods. More particularly, the present invention relates to radiation measuring apparatus and methods utilizing a single Geiger Mueller tube (GMT) that provides a count range extending over eight decades, e.g. from background dose rates on the order of $20 \times 10^{-6}$ rads (R) per hour (20 μR/h) to high dose rates on the order of 1000 R/h.

Detectors for measuring radiation fields have included ion chambers, proportional counters, Geiger-Muller tubes, scintillation crystals, and solid-state semiconductors. Each has advantages and disadvantages, and the selection of a particular detector depends upon the particular application for which the detector will be used. A single measurement apparatus for measuring radiation fields from very low intensity to extremely high intensity is highly desirable, but has been difficult to achieve due to the limiting physics phenomena of the various detectors at either the high or low regions of radiation dosage.

One of the most common and well-known radiation measuring apparatus is the geiger counter, sometimes called a Geiger-Mueller counter. The geiger counter detects ionizing radiation, including gamma rays and x-rays, and alpha and beta particles. At the heart of a geiger counter is a Geiger Mueller tube (GMT), which typically comprises a glass tube about 2 cm in diameter enclosing a metal cylinder, often of copper, about 10 cm long. (Other dimensions are, of course, also commonly used.) A thin metal wire, e.g. of tungsten, passes along the axis of the metal tube. The cylinder and wire are connected through an end wall of the glass tube to a source of electrical voltage. The tube is filled with a gas, usually a mixture of an inert gas, such as argon or neon, and a halogen, such as chlorine or bromine, at a low pressure, e.g., a few centimeters of mercury. A high voltage, e.g. 550 volts, is set up between the cylinder (which functions as the negative electrode or cathode) and the wire (which functions as the positive electrode or anode). This voltage is just a little less than that needed to create an electrical discharge between the two electrodes.

When a charged particle of sufficient energy enters the GMT, it knocks electrons out of the atoms of the gas. These electrons, being negatively charged, are attracted towards the wire anode, and the atoms from which the electrons originated (which become positively charged ions) are attracted towards the cathode. The high voltage established between the anode and cathode creates a high voltage gradient that accelerates the liberated electrons sufficiently to knock further electrons out of atoms, which in turn are accelerated by the high voltage gradient to knock still further electrons out of other atoms, creating an "avalanche" of electrons. As the avalanche of electrons continues, the positive ions are also accelerated towards the cathode wall. These positive ions strike the cathode wall with sufficient energy to release still additional electrons. All of these electrons descend on the anode wire and are detected as a pulse of electric current. The occurrence of this pulse thus indicates that a charged particle has passed through the tube. The electrical pulses can then be amplified and counted, using appropriate electronic counting circuitry, and/or converted to audible sound, to provide a user of the geiger counter a quantitative and/or qualitative measure of the number of charged particles encountered by the GMT.

Unfortunately, the rate at which charged particles can be detected by the GMT is limited. This is because during a discharge, i.e., during that time during which the electron avalanche is occurring, the GMT is insensitive to further charged particles arriving at the detector. Thus, some means must be employed to stop the electron avalanche, and to prepare the GMT to detect the next arriving charged particle.

One common technique used to help stop the avalanche is to reduce the voltage potential between the anode and cathode. Some reduction of this voltage occurs naturally as the electrical pulse developed on the anode effectively discharges the charged GMT (which may be considered prior to discharge as a charged capacitor). However, it is also known in the art to deliberately decrease the applied voltage potential for a sufficient time to allow the electron avalanche to sweep out of the GMT, at which time the voltage is again raised to a value just a little less than needed to create an electrical discharge. See, e.g., U.S. Pat. Nos. 4,605,859 and 4,631,411.

The time it takes to stop the electron avalanche and prepare the GMT to detect the next charged particle limits the rate at which charged particles may be detected. Most conventional GMT counters have a recovery time on the order of $10^{-5}$ seconds, or 10 μsec. In other words, after detecting a charged particle (as evidenced by the occurrence of an electrical pulse), it takes at least 10 μsec for the charge to be swept out of the tube before the tube can be readied to detect the next charged particle. Thus, such conventional geiger counters are able to detect charged particles or radiation at a rate that is limited to no more than about 100,000 pulses per second. Unfortunately, where the sensitivity of the GMT must be on the order of 25 cps/(mR/H), as indicated below, this recovery time significantly limits the high dosage rate at which radiation can be detected.

In addition to being rate limited, it is common in the art to employ differently constructed GMTs to detect different levels of radiation. That is, a particular type of gas, tube size, tube materials, and applied anode voltage may be better suited for detecting low levels of radiation than is best suited for detecting high levels of radiation. Hence, depending upon the particular level of radiation expected, a different GMT may be needed. Thus, in order to detect a wide range of radiation levels for those applications where use of a GMT is indicated, it has frequently heretofore been necessary to maintain an inventory of several GMT-based measuring devices.

The ideal radiation measurement device would be portable and would typically include operation from background radiation levels on the order of 20 μR/h to high radiation levels on the order of 1000 R/h. Accuracy and response time requirements at the lower end of this range have typically dictated the use of a detector with a sensitivity of at least 25 cps (counts per second) per mR/h. Unfortunately, the photon interaction rate in a 25 cps/(mR/h) GMT is around $2.5 \times 10^{-7} \sec^{-1}$ at the upper dose rate limit of 1000 R/h. Hence, the relatively long resolving times of GMT's (tens of microseconds) requires that the counting circuit be more than just a fast counter.

Radiation measurement instruments are available, see U.S. Pat. Nos. 4,605,859 and 4,631,411, that address this problem by lowering the anode voltage below the Geiger threshold until the tube is in a fully recovered condition (i.e., until all space charge from the previous Geiger events has been swept from the tube), and then quickly increasing the voltage above the threshold, and then measuring the time interval to the next Geiger pulse. This is essentially a reciprocal rate measurement (i.e., dosage rate is determined by measuring the period of the time between raising the anode voltage to its operating level and receiving the next Geiger pulse), and the statistical accuracy of such measurement is improved by averaging successive measurements.

The reciprocal rate measurement technique can only be as accurate as the starting point for measuring the Geiger period. Unfortunately, this starting point, when the anode voltage is precisely at its proper operating value, is not known with a great deal of certainty. Hence, as the Geiger period becomes shorter and shorter (higher and higher dosage rates), the uncertainty of the starting point of the period contributes a larger and larger error to the measurement. Because the measurement thus becomes increasingly inaccurate for short time intervals, reciprocal rate measurement instruments of the prior art have hereto employed a relatively sensitive GMT to span the lower part of the dynamic range and a less sensitive GMT to span the upper decades. Unfortunately, this approach requires separate calibration factors for each tube and provisions in both the hardware and firmware for selecting only one of the two tubes. What is needed is measurement apparatus that utilizes the advantages of a reciprocal rate measurement, yet only requires a single GMT (thereby simplifying both hardware and firmware/software), and that eliminates the uncertainties of the beginning of the Geiger period, thereby allowing statistical techniques to be used to make an accurate estimate of the high dosage rates. The present invention advantageously addresses these and other needs.

SUMMARY OF THE INVENTION

The present invention provides a system and method for extending the useful measurement range of a single Geiger-Mueller tube (GMT). This method is referred to herein as Extended Range Geiger (ERG) counting. As its name implies, ERG counting is intended to extend the radiation count range of a conventional GMT. Low radiation levels (i.e., background radiation), as well as moderate radiation levels, may be measured using conventional GMT measurement techniques, e.g., a reciprocal rate measurement technique as is known in the art or a count rate measurement with dead time correction. Higher radiation levels, however, are measured using ERG counting. Radiation measuring apparatus made in accordance with the present invention may thus include a single GMT tube that may operate in either a conventional mode or an ERG mode, depending upon the radiation levels being measured.

As indicated previously, one of the problems associated with a reciprocal rate measurement technique is the uncertainty associated with the start time of the Geiger period. To overcome this problem, the ERG counting method of the present invention, in effect, discards or ignores the earliest portion of the measurement period, i.e., that portion wherein the greatest uncertainties lie. The ERG counting method then measures the remaining Geiger period, beginning from a point in time when the initial conditions associated with the GMT are clearly defined, in relatively large time increments, or trial periods, $N_T$. Each trial period, $N_T$, has a fixed duration. Each trial period $N_T$ that elapses in the remaining Geiger period without a charged particle being detected is counted. When a charged particle is detected, that event is likewise counted, and the process repeats, i.e., a new Geiger period is initiated, with a front portion of the new Geiger period being discarded or ignored, and the number of trial periods $N_T$ until the next detection of another charged particle is counted. A measure of the radiation level to which the GMT is exposed may be computed at any time during this process as a function of the number of charged particles detected and the number of trial periods that have been counted.

Advantageously, using this method there are no uncertainties present as to when the valid portion of the Geiger period begins. Further, due to the manner in which the radiation level is computed (which is essentially a statistical computation), the inherent delays associated with clearing the GMT after the detection of each charged particle do not limit the maximum radiation count rate that can be computed.

One aspect of the present invention thus provides a method of measuring radiation using a single Geiger Muller tube (GMT). The GMT used with such method is characterized by generating a GMT-pulse (or equivalent electrical signal) in response to the detection of a charged particle, and has a recovery period that must elapse after detecting a charged particle before a subsequent charged particle can be detected. A first step of this radiation measurement method involves defining a first time period greater than the GMT recovery period. This first time period commences immediately subsequent to the detection of a charged particle by the GMT. A second step comprises counting all of the GMT-pulses generated by the GMT except those occurring during the first time period. A third step involves defining a recurring time interval, e.g., by generating a clock signal having a fixed period equal to the defined time interval. A fourth step comprises counting all of the time intervals that occur subsequent to the first time period and prior to the detection of the next charged particle by the GMT. A fifth step involves statistically determining a measure of the number of charged particles detected by the GMT (i.e., the radiation to which the GMT is exposed) as a function of the cumulative GMT-pulse count and the cumulative basic time interval count.

Another aspect of the invention provides radiation measurement apparatus. Such apparatus includes: (a) a single Geiger-Mueller tube (GMT); (b) means for establishing specified initial conditions of the GMT so that the GMT is enabled to detect a charged particle; (c) means for measuring detection and elapsed time data indicative of the number of charged particles detected by the GMT, and the time interval between when the GMT is enabled and when a given charged particle is detected; (d) means for discarding a first portion of the detection and elapsed time data, this first portion of data including at least that portion of the data during which the initial conditions associated with the GMT are uncertain; and (e) means for processing a second portion of the detection and elapsed time data in order to determine the radiation dosage rate to which the GMT has been exposed, this second portion of data not including the first portion of data. Advantageously, the processing means used with the second portion of data applies statistical measurement techniques that allow radiation dosage rates in excess of the maximum dosage rates that could otherwise be detected with a single GMT using a reciprocal rate measurement technique of the type employed in prior art radiation measurement apparatus.

Radiation measurement apparatus in accordance with a preferred embodiment of the present invention includes: (a) a single Geiger-Mueller tube; (b) voltage control means; (c) oscillator means; (d) first counter means; (e) second counter means; (f) dwell means; (g) time sequencer means; and (h) processor means. In operation, the GMT produces an electrical pulse upon the detection of a charged radiation particle. The GMT further exhibits a recovery time equal at least to the time it takes a charged radiation particle to clear the GMT once the charge has been detected. The voltage control means applies a voltage of a first prescribed value to the GMT in response to a first timing signal, and applies a voltage of a value less than the first prescribed value to the GMT in response to a second timing signal. The voltage of the first prescribed value enables the GMT to detect a charged radiation particle and produce an electrical pulse, while a voltage of a value less than the first prescribed value disables the GMT. The oscillator means generates a recurring clock signal that has a fixed clock period. The first counter means is coupled to the GMT and maintains a count of the number of electrical pulses produced by the GMT when enabled by a first enabling signal. The second counter means is coupled to the oscillator means and maintains a count of the number of clock transitions (e.g., low-to-high transition) that occur within the clock signal when enabled by a second enabling signal. The dwell means is coupled to the GMT and generates the second timing signal and also triggers a prescribed dwell period in response to an electrical pulse produced by the GMT. The time sequencer means responds to the dwell period and the clock signal and generates the first timing signal and the first and second enabling signals. The time sequencer means is disabled during the dwell period. The first timing signal is generated after a prescribed number of clock transitions subsequent to the dwell period, and the first and second enabling signals are respectively generated after an assigned number of clock transitions subsequent to the dwell period. Finally, the processing means computes the radiation dosage rate to which the GMT has been exposed as a function of the respective counts maintained within the first and second counters.

It is a feature of the present invention to provide a radiation measurement method that extends the useful geiger range of a Geiger-Mueller tube (GMT).

It is another a feature of the invention to provide radiation measurement apparatus and a radiation measurement method that utilizes an improved reciprocal rate measurement approach (measuring time periods rather than frequency) that removes the time uncertainties associated with the beginning of a measurement interval.

It is a further feature of the invention to provide such radiation measurement apparatus and method that utilizes only a single GMT. As a result, the amount of circuitry and the complexity of the circuitry may be greatly simplified over that required in prior art apparatus utilizing multiple GMT's. The reduced circuitry and fewer components of the apparatus of the present invention advantageously allow it to be more reliable, less costly, consume less power, and be packaged smaller, than prior art apparatus.

Yet another feature of the invention provides radiation measurement apparatus that is small, light weight, and portable.

An additional feature of the invention provides radiation measurement apparatus that accurately detects radiation dosage rates over a wide range, e.g., from background rates, on the order of 20 $\mu$R/h, to 1000 R/h, using a single GMT.

A further feature of the invention provides radiation measurement apparatus utilizing a single GMT that may operate in either a conventional counting mode, a conventional reciprocal rate measurement mode or an extended range geiger (ERG) measurement mode.

BRIEF DESCRIPTION OF THE DRAWINGS

The above and other aspects, features and advantages of the present invention will be more apparent from the following more particular description thereof, presented in conjunction with the following drawings wherein:

FIG. 5 is a flow chart illustrating one manner in which the reciprocal rate measurement method of the present invention is carried out;

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

As has been explained, it is known for GMT-based devices to use a reciprocal rate measurement technique. Such technique measures the time period T between detected charged particles and averages this time ($T_{ave}$) over a sufficiently long period to provide a measure of the radiation dosage rate. (The dosage rate is proportional to $1/T_{ave}$).

However, because of the recovery time associated with a GMT (wherein the GMT is incapable of detecting a new charged particle until the charge from the most recently detected charged particle has cleared the tube), there is an inherent inaccuracy in simply measuring the time period T between detected charged particles. This inaccuracy results because there may be some charged particles that occur during the GMT's recovery period, and are hence not detectable.

To overcome this problem, it is known in the art to disable the GMT for a prescribed dwell period, $T_D$, immediately after a charged particle is detected. The duration of the period $T_D$ is selected to be just longer than the longest anticipated recovery period of the GMT. Then, the time period from the end of the dwell period to the detection of the next charged particle is measured and averaged, thereby providing a measure of the dosage rate using the reciprocal rate method.

The technique commonly used to disable the GMT for the dwell period $T_D$ is to lower the anode voltage of the GMT. With the anode voltage lowered below a specified operating voltage, the GMT is unable to detect charged particles. Then, at the conclusion of the dwell period, the anode voltage is raised back to its operating value, thereby enabling the GMT to detect the next charge.

Figure 1:
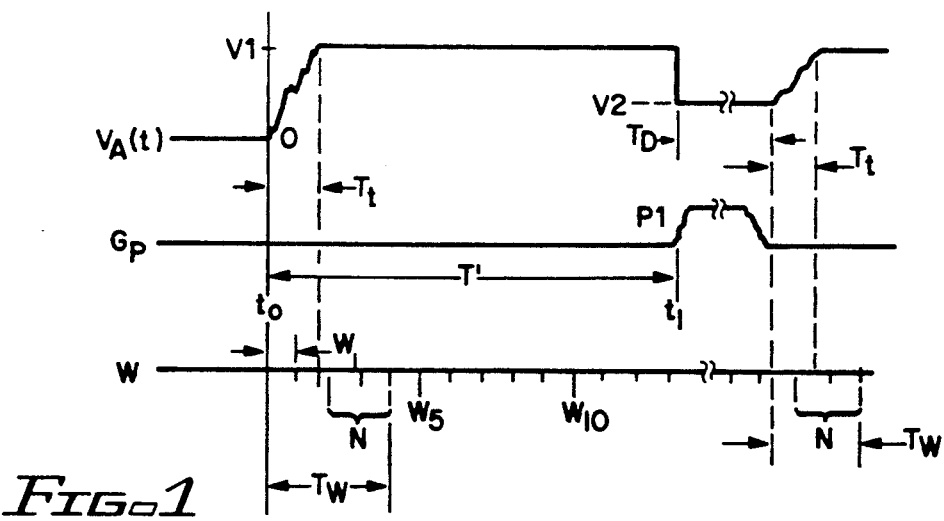
FIG. 1 is a timing diagram that illustrates the uncertainty problem associated with a reciprocal rate measurement method, and further illustrates the concept of using discritized time windows to overcome this problem.

The process of controlling the anode voltage to selectively enable and disable a GMT is illustrated in FIG. 1. The uppermost waveform in FIG. 1 is the anode voltage $V_A$ of a GMT as a function of time, $V_A(t)$. Before time $t_0$, $V_A$ is zero, and the GMT is thus turned OFF. At time $t_0$, $V_A$ is raised to V1, the operating voltage of the GMT. Thereafter the GMT is enabled and ready to detect a charged particle. At time $t_1$ a charged particle is detected, as indicated by a Geiger pulse P1 in the second waveform $G_P$. The occurrence of the pulse P1 triggers the anode voltage $V_A$ to drop to a second value V2 which is well below the operating voltage of the GMT. Hence, while the anode voltage is maintained at V2, the GMT is disabled.

The anode voltage $V_A$ remains at the disabling value V2 for the duration of the dwell period $T_D$. $T_D$ is selected to be longer than the recovery time of the GMT. At the conclusion of the dwell period $T_D$, the anode voltage is again raised to V1, and the GMT is thus ready to detect the next charged particle.

FIG. 1, as thus far described, illustrates the basic uncertainty associated with a reciprocal rate measurement method. In accordance with such a method, the time at which the Geiger pulse P1 occurs, $t_1$, is used as a measure of the detection period (i.e., the period of time from enablement of the GMT to the detection of the first charged particle). The detection period T' is thus $t_1-t_0$. Unfortunately, this detection period T' is subject to significant uncertainties due to the finite time it takes the anode voltage $V_A$ to reach its well established operating voltage V1. This time, which may be considered as a "transient time" or "rise time", is illustrated in FIG. 1 as the time period $T_t$.

To eliminate the uncertainties associated with making a time measurement that includes uncertain initial conditions and transient times, the present invention divides the time that the GMT is active into equal discretized time windows $W_n$, n=1, 2, 3, . . .. The first of such discretized time windows $W_1$ is shown in FIG. 1 as beginning at time $t_0$ and continuing for a discretized time thereafter. Thereafter, successive "tick marks" along the horizontal axis of the signal line W represent the boundaries between the successive windows $W_n$, with every fifth mark signaling the end of time windows $W_5$, $W_{10}$, . . ., and being labeled accordingly.

The duration of each time window $W_n$ may be defined by an appropriate clock signal having a frequency $f_{osc}$. ($W=1/f_{osc}$.) In accordance with the present invention, a prescribed wait period $T_W$ is defined that commences at the conclusion of the dwell period, $T_D$. This wait period $T_W$ is preferably defined in terms of a selected number of time windows N, or more particularly, a selected number of time window transitions (i.e., the boundary between adjacent time windows). After the conclusion of the wait period, each time window is monitored to determine if a Geiger pulse occurs therein. During this "wait period", $T_W$, the anode voltage of the GMT is able to reach the operating voltage V1, and thus provide a stable, known initial condition for the GMT as it begins to monitor each time window thereafter for the occurrence of a Geiger pulse. Each time a Geiger pulse occurs, the anode voltage is lowered to V2 for the dwell period $T_D$, after which the anode voltage is again raised to V1. At the conclusion of N time windows after the dwell period $T_D$, i.e., at the conclusion of $T_W$, each time window is again monitored to determine the occurrence of a Geiger pulse.

In FIG. 1, and by way of illustration only, the "wait period" $T_W$ is shown as being two complete time window transitions after the termination of the dwell period $T_D$. That is, N=2. Thus, at the conclusion of the dwell period $T_D$ (which dwell period is selected to be slightly longer than the recovery time of the GMT), at least two complete time windows must elapse (thereby providing two time window transitions) before additional time windows $W_n$ will be monitored for the occurrence of a Geiger pulse. The time windows that occur during $T_D$ and $T_W$ are thus not monitored for Geiger pulses, but are rather, in effect, discarded or ignored and not considered as containing valid data. The value of N may, of course, be selected to be any desired value. For window periods on the order of 40-70 nanoseconds ($f_{osc}=14.3$ MHz to 25 MHz), the wait period $T_W$ will typically be selected to be in the range of 2 to 4.

By counting the number of Geiger pulses detected in a given number of monitored time windows, it is possible to statistically determine the radiation dosage rate to which the GMT has been exposed. That is, if $N_T$ trial intervals (time windows) are considered, and $N_P$ of these intervals are found to contain the leading edge of a Geiger pulse, then the probability $P_P$ for finding a pulse in any window is $$P_P = N_P/N_T. \quad (1)$$

Similarly, the probability $P_E$ for not finding a pulse in any window (i.e., the probability of an empty window) is $$\begin{aligned} P_E &= 1 - P_P \\ &= (N_T - N_P)/N_T. \end{aligned} \quad (2)$$

It can be shown that the interaction of charged particles in the GMT is a Poisson process having a mean rate of $v_g s^{-1}$. Hence, the probability that a charged particle will not occur during a given time interval, W, (where $W=1/f_{osc}$), may also be written as $$P_E = \exp(-v_g/f_{osc}). \quad (3)$$

Equating Equations (2) and (3) yields:

$$\exp(-v_g/f_{osc}) = (N_T - N_P)/N_T. \quad (4)$$

By solving Equation (4) for $v_g$, (where $v_g$ is the mean interaction rate of charged particles with the GMT), a basic Extended Range Geiger (ERG) relation is obtained that provides the basis for the ERG method of the present invention:

$$v_g = f_{osc} \ln[N_T/(N_T - N_P)]. \quad (5)$$

The mean interaction rate specified in Equation (5) is easily converted to a dose rate, $R_g$, by dividing it by the sensitivity, S, of the GMT (where S is expressed in terms of cps/(R/h)). Thus, $$R_g = f_{osc} \ln[N_T/(N_T - N_P)]/S. \quad (6)$$

Figure 2:
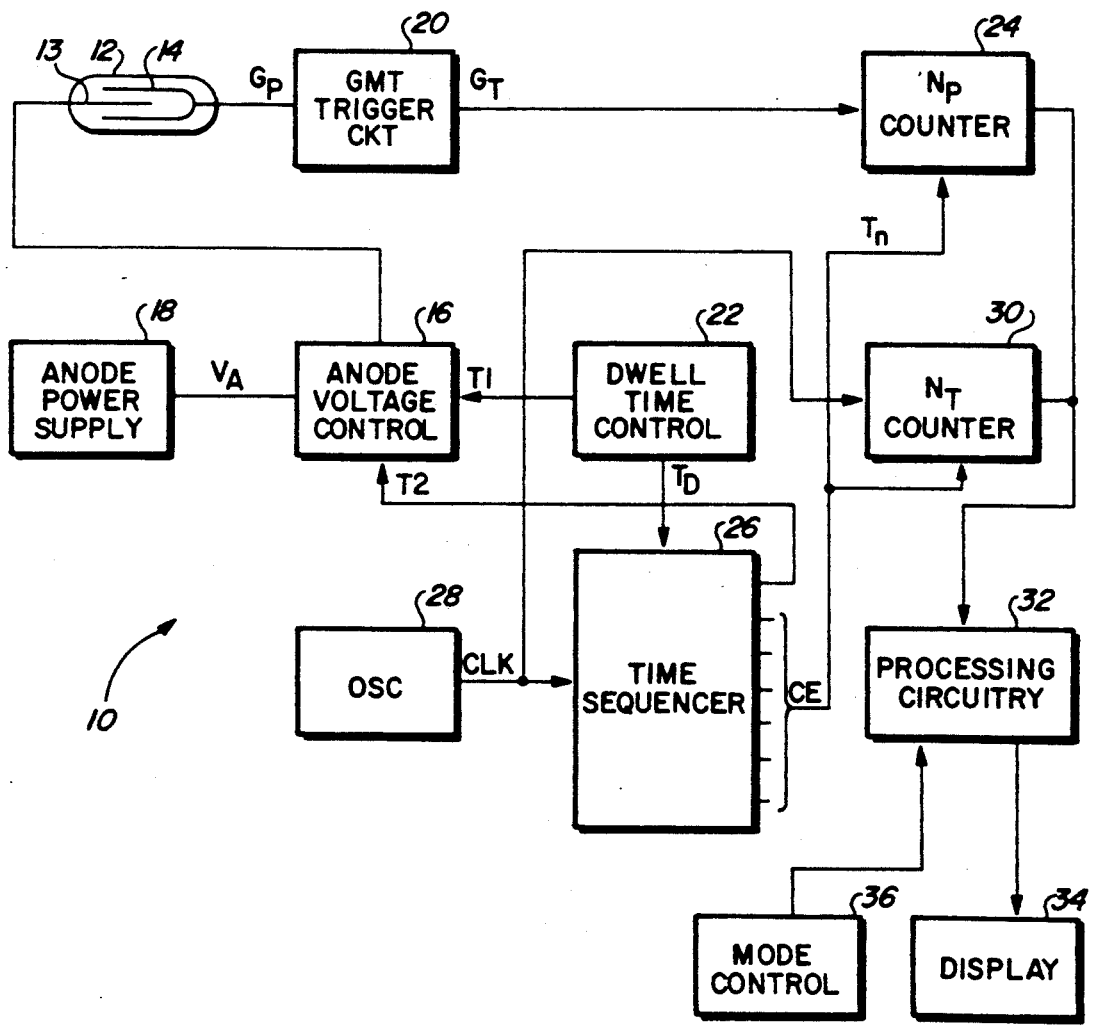
FIG. 2 is a block diagram of radiation measurement apparatus made in accordance with the present invention.

Referring next to FIG. 2, a block diagram of radiation measurement apparatus 10 made in accordance with the present invention is shown. As seen in the block diagram of FIG. 2, the measurement apparatus 10 includes a single GMT 12, an anode power supply 18, anode voltage control circuitry 16, GMT trigger circuitry 20, dwell time control circuitry 22, a geiger pulse counter 24, a time sequencer 26, an oscillator 28, a time interval counter 30, and processing circuitry 32. In addition, a display circuit 34, and mode control circuitry 36 are typically used in conjunction with the processor 32 in order to display the measured dose rate and provide a convenient means for changing the operating mode of the apparatus, e.g., from a conventional operating mode to an ERG operating mode. (As will be appreciated by those skilled in the art, the processor 32 typically includes, in addition to processing means, means for storing data, means for inputting data and commands, and means for displaying/printing data and other information. Hence, the display circuitry 34 and mode control circuitry 36 may actually form part of the processor 32.)

The GMT 12 includes an anode 13 and a cathode 14. The anode 13 is connected to the anode voltage control circuitry 16. The anode power supply 18 generates the high anode voltage $V_A$ needed for operation of the GMT. The voltage control circuitry 16 controls or modulates the anode voltage $V_A$ so that the GMT 12 is either enabled (ready to detect charged particles) or disabled (unable to detect charged particles).

When a charged particle is detected by the GMT 12, a Geiger pulse, $G_P$, appears at the cathode 14. This pulse $G_P$ is sensed by the GMT trigger circuit 20, which circuit 20 is electrically connected to the cathode 14. In response to the Geiger pulse $G_P$, the GMT trigger circuit 20 generates a trigger pulse $G_T$. This trigger pulse is sent to the geiger pulse counter 24 (also referred to as the "$N_P$ Counter") where it is counted if the $N_P$ Counter 24 is enabled. The trigger pulse $G_T$ is also sent to the dwell time control circuitry 22. The dwell time control circuitry 22 generates the dwell time period $T_D$. At the leading edge or start of the dwell time period $T_D$, the dwell time control circuitry generates a control signal T1 that is sent to the anode voltage control circuitry 16, causing the anode voltage control circuitry to lower the anode voltage of the GMT. During the dwell time period $T_D$, the dwell time control circuit 22 disables the time sequencer 26. The dwell time period $T_D$ is selected to be greater than the recovery time of the GMT. As the recovery time of most GMT's is on the order of 10–20 μsec, the time $T_D$ should generally be selected to be greater than, e.g., 40 μsec.

After the dwell time period, $T_D$, has elapsed, the time sequencer 26 is enabled. The oscillator 28, producing a clock signal CLK having a period W, is connected to the time sequencer. It is the function of the time sequencer 26 to produce various timing control signals in a prescribed sequence as synchronized with the clock signal. A first timing control signal, T2, generated soon after the sequencer is enabled, is directed to the anode voltage control circuitry 16 and raises the anode voltage $V_A$ back to its operating value. A second timing control signal, $T_n$, is directed to the $N_P$ Counter 24 and the trial interval counter 30 (also referred to as the "$N_T$ Counter"). This control signal $T_n$ functions as a count enable (CE) signal that enables both the $N_P$ Counter 24 and the $N_T$ Counter 30. The time sequencer 26 generates the CE signal so as to enable the counters 24 and 30 only after a prescribed wait period $T_W$ has elapsed subsequent to the raising of the anode voltage $V_A$ to the GMT's operating value, i.e., subsequent to generating the control signal T2. When thus enabled, the $N_P$ Counter 24 counts the next trigger pulse $G_T$, and the $N_T$ Counter 30 counts each time interval, i.e., counts each period of the clock signal CLK.

Still referring to FIG. 2, the processing circuitry 32 monitors the contents of the $N_P$ Counter 24 and the $N_T$ Counter 30 and computes the radiation dosage rate, $R_g$, in accordance with Equation (6), above. The dosage rate thus computed may then be displayed in the display device 34.

In one embodiment, the processing circuitry 32 computes the dosage rate $R_g$ on a periodic basis, e.g., such as every 20 seconds. After each computation, the $N_P$ and $N_T$ Counters are reset, and after the next 20 seconds, the next computation is made. The displayed dosage rate may be a running average of the last 10 measurements thus made. (It is to be understood that the values of "20 seconds" and "the last 10 measurements" are only illustrative, and not limiting.)

In a preferred embodiment, the processing circuitry 32 computes the dosage rate $R_g$ whenever the $N_P$ Counter 24 reaches its maximum count, i.e., whenever the $N_P$ Counter is full. In such instance, an overflow bit from the counter 24 may be used to signal the processing circuitry 32 to compute the dosage rate in accordance with Equation (6). The value of $N_P$ in such computation will always be fixed (equal to the maximum count value of the $N_P$ Counter), thus simplifying the processing because only the value of $N_T$ need be transferred to the processor 32 from the $N_T$ Counter in order to perform the computation.

Figure 3A:
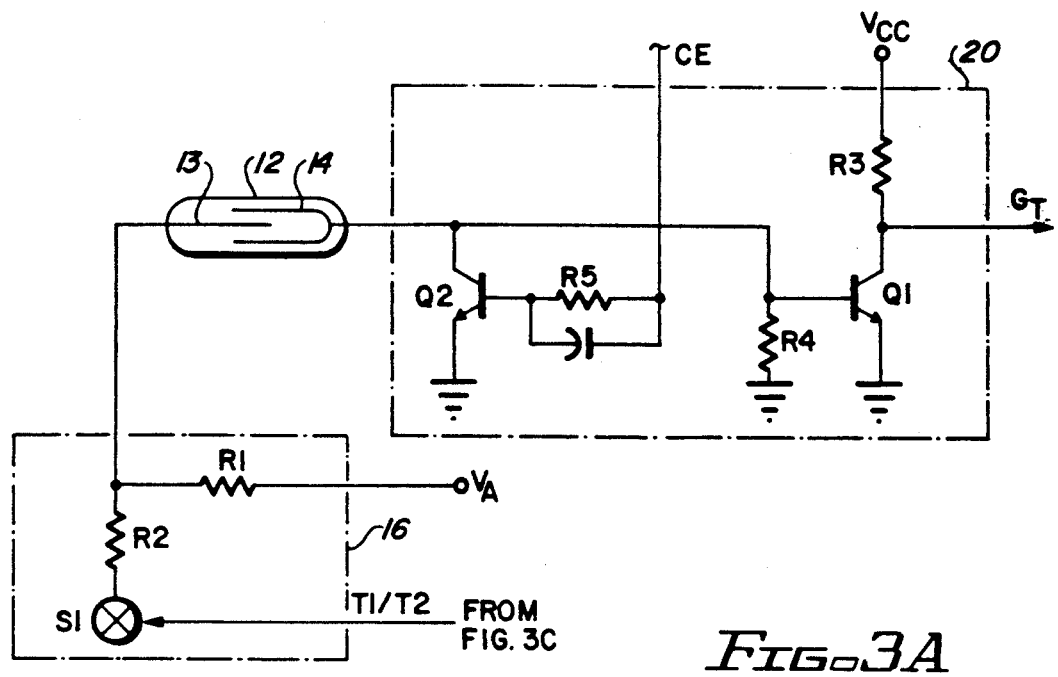
FIGS. 3A-3C are logic schematic diagrams of the measurement apparatus shown in FIG. 2, with FIG. 3A being a simplified schematic diagram of the GMT Trigger and Anode Voltage Control circuits, FIG. 3B being a similar diagram of the Oscillator, Dwell Time Control, and Time Sequencer Circuits, and FIG. 3C being a similar diagram of the $N_P$ and $N_T$ Counters and associated control/access circuitry.
Figure 3B:
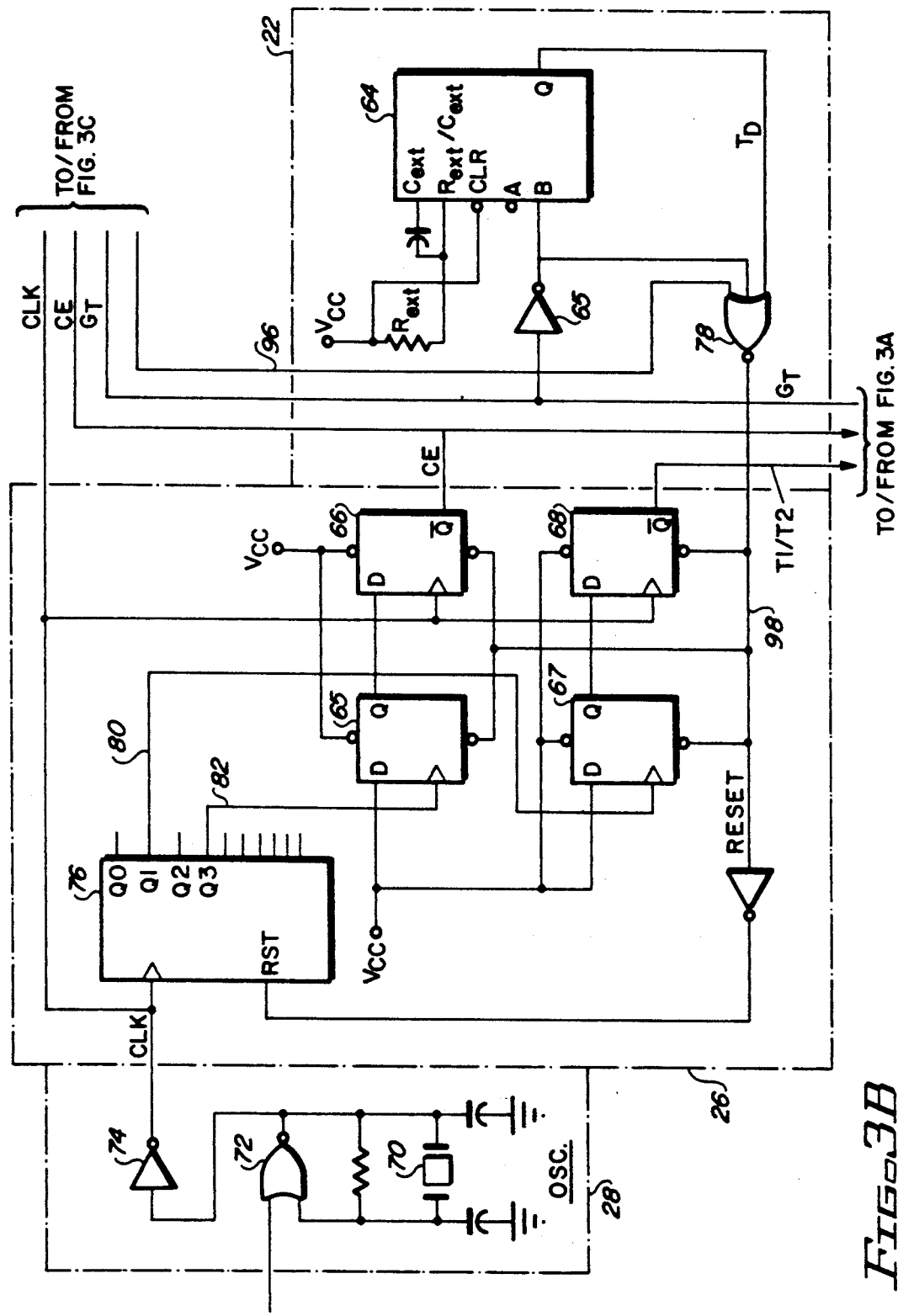
Figure 3C:
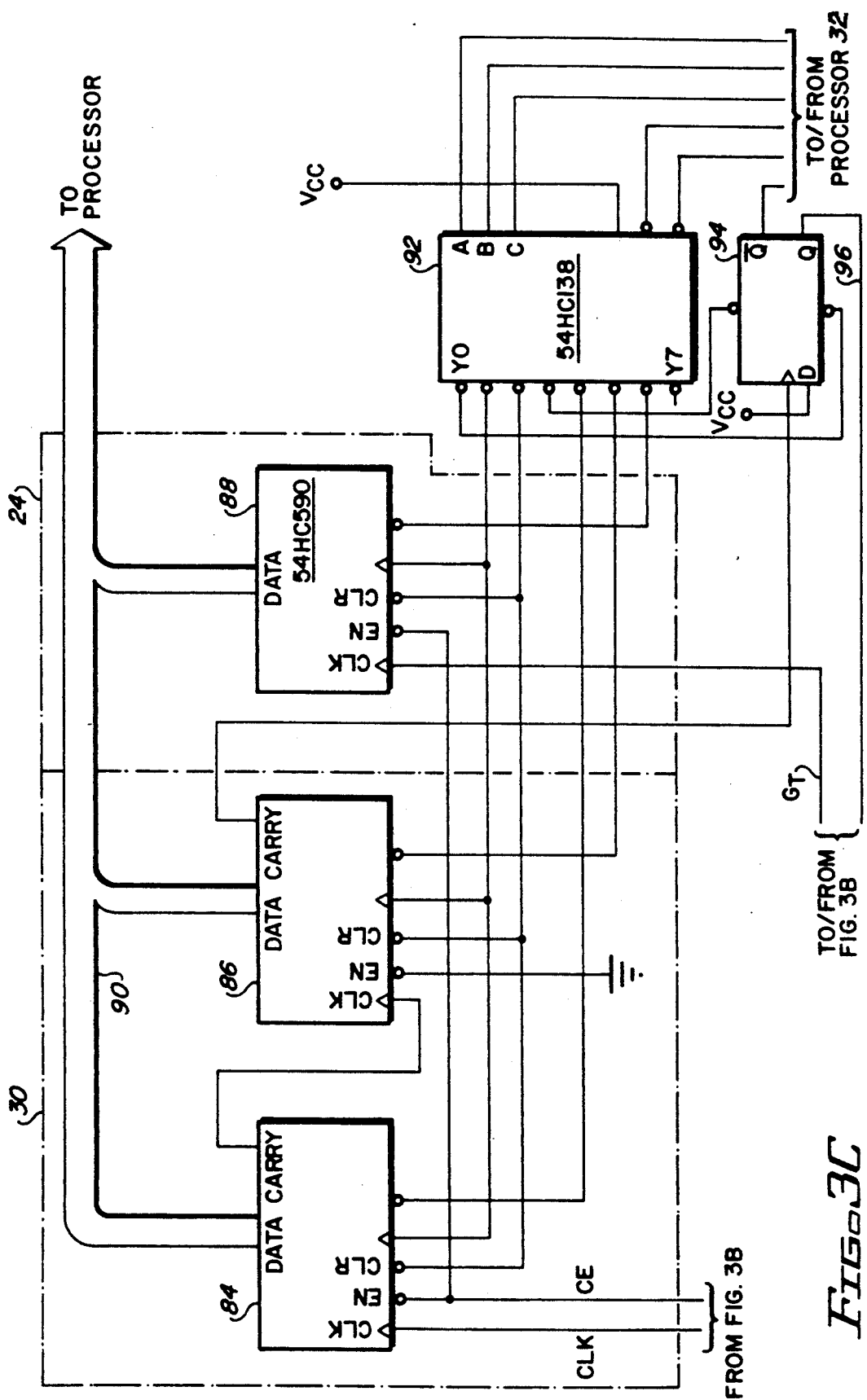

FIGS. 3A–3C are logic schematic diagrams of the measurement apparatus shown in the block diagram of FIG. 2. More particularly, FIG. 3A shows a simplified schematic diagram of the GMT Trigger Circuit 20 and Anode Voltage Control Circuit 16. FIG. 3B depicts the Oscillator 28, the Dwell Time Control circuit 22, and the Time Sequencer 26. FIG. 3C illustrates the $N_P$ Counter 24 and the $N_T$ Counter 30, and associated control/access circuitry.

The requisite anode voltage $V_A$ needed for operation of the GMT 12 (FIG. 3A) is generated by the anode power supply circuit 18. This anode power supply circuit 18 may be of conventional design. It need only generate a reasonably well filtered source of high voltage, e.g., 550 volts.

Referring to FIG. 3A, it is seen that the anode voltage $V_A$ is coupled to the anode 13 of the GMT 12 through resistor R1. Another resistor R2 is selectively connected from the anode 13 of the GMT to ground through switch S1. When switch S1 is OFF, the anode voltage remains essentially at the operating voltage $V_A$ of the GMT. (This is because the GMT requires very little anode current, and hence there is very little voltage drop, if any, across R1.) When switch S1 is ON, however, the anode voltage applied to the GMT is divided by the resistive dividing network comprising R1 and R2. In a preferred embodiment, R1=R2, so that the anode voltage $V_A$ drops to roughly $V_A/2$ when S1 is ON.

The switch S1 may be controlled in any appropriate manner so long as it is ON when the anode voltage is to be less than the operating voltage $V_A$, and OFF when the anode voltage is to be equal to the operating voltage $V_A$. Numerous switching devices and schemes are known in the art may be used for this purpose. For example, the switch S1 may be realized using a transistor having its base or gate terminal connected to the control signals T1 and T2 (shown as separate control signals in FIG. 2). However, these signals may be a single control signal that is either a high or a low voltage, labeled T1/T2 in FIG. 3A, which high or low signal turns the switch S1 ON or OFF.

Still referring to FIG. 3A, it is seen that the GMT trigger circuit 20 is coupled to the cathode 14 of the GMT 12. This trigger circuit includes two NPN transistors Q1 and Q2. The emitter of both Q1 and Q2 is connected to ground. The collector of transistor Q2 and the base of transistor Q1 are connected to the cathode 14 of the GMT 12. The collector of transistor Q1 is connected to the power supply voltage $V_{cc}$ through resistor R3. The base of transistor Q2 is coupled through resistor R5 to control line CE, which control line is connected to a flip flop 66 in the time sequence circuit 26, as described below in conjunction with FIG. 3B.

During normal operation, when the GMT is "armed" and ready to detect a charged particle, the signal on control line CE (hereafter the control signal CE) is high and turns Q2 ON, thereby connecting the cathode 14 of the GMT 12 to ground. This same action, maintains transistor Q1 OFF. Upon the detection of a charged particle, the cathode of the GMT momentarily rises in voltage potential as the avalanche of electrical charge clears the GMT. This momentary rise in potential is sufficient to turn Q1 ON, which action lowers the collector of Q1 to ground potential. The collector of Q1, labeled $G_T$ in FIG. 3A, is coupled to the timing circuits described below in connection with FIG. 3B. As will be evident from the description of FIG. 3B below, when $G_T$ goes low, the control signal CE also goes low, turning transistor Q2 OFF. The control signal CE remains low for a time determined by the dwell time control circuit 22 and time sequencer circuit 26 (FIG. 3B). As has been explained, this time is selected to be sufficient to exceed the recovery time of the GMT plus the rise time associated with the GMT anode voltage $V_A$. After the expiration of this time, CE again goes high, thereby turning Q2 ON, and connecting the cathode 14 of the GMT to ground, enabling it to detect (in conjunction with raising the anode voltage to its operating value) additional charged particles.

Referring next to FIG. 3B, a logic schematic diagram of the oscillator 28, the dwell time control circuit 22 and the time sequencer 26 is shown. The oscillator 28 includes a crystal 70 connected in feedback circuit relationship with an inverting logic gate 72, in conventional oscillator fashion. The output of gate 72 is coupled through a buffer gate 74, producing a clock signal CLK having a staple period W. The frequency of the clock signal CLK is thus 1/W. Any desired period (and hence frequency) may be used for the oscillator 28. In a preferred embodiment, the period is selected to be within the range of 40–70 nanoseconds (i.e., the frequency of the oscillator lies within the range of 25 MHz to 14.3 MHz. For example, the frequency of the oscillator may be selected to be 16 MHz, thereby providing a period W of 62.5 nsec.

The time sequencer circuit 26 includes a decade counter 76 and four flip flops 65, 66, 67, and 68. The dwell time control circuit 22 includes a one shot multivibrator 64 ("one shot 64"), and various logic gates. One of the multiple outputs from the decade counter 76 is connected to the clock input of flip flop 65. Another of the outputs from the decade counter 76 is connected to the clock input of flip flop 67.

The clock signal CLK is connected to the clock input of decade counter 76 and to the clock input of flip flops 66 and 68, and also to the $N_T$ counter (FIG. 3C). The data (D) inputs of flip flops 66 and 68 are respectively connected to the data outputs of flip flops 65 and 67. The flip flops 65 and 67 are, in turn, connected to selected outputs from the decade counter 76. The reset terminals of the decade counter 76 and the flip flops 65–68 are all coupled to the output of the one shot 64. Thus, the triggering of the one shot 64 resets the flip flops 65–68 and the decade counter 76. During the time that the one shot is active, the decade counter 76 cannot operate and the flip flops 65–68 cannot change state.

The one shot 64 is configured, using resistor $R_{ext}$ and capacitor $C_{ext}$, to provide a timing pulse equal to the desired dwell time, $T_D$, i.e., a time period slightly longer than the recovery time of the GMT. The one shot 64 is triggered by the $G_T$ pulse generated by the GMT trigger circuit 20 (FIG. 3A). This $G_T$ pulse is further presented to the $N_P$ Counter 24 (FIG. 3C). At the expiration of this dwell time, the counter 76 is enabled and starts to count periods of the CLK signal (or, more accurately, counts a specified transition of the CLK signal). On a first prescribed rising edge of the CLK signal after being thus enabled, e.g., after the first rising edge, the output 80 of the counter 76 goes high, thus clocking flip flop 67 and enabling flip flop 68 to be synchronously toggled by the next rising edge of the CLK signal. At that time, e.g., when flip flop 68 changes state, the T1/T2 control line (the output of flip flop 68) goes low, and the anode voltage control circuit causes the anode voltage $V_A$ to be rapidly increased to 100% of the GMT's operating voltage.

On a second prescribed rising edge of the CLK signal after the expiration of the dwell period, e.g., after the third rising edge, the output 82 of the counter 76 goes high, thus clocking flip flop 65 and enabling flip flop 66 to be synchronously toggled by the next rising edge of the CLK signal. When this occurs, i.e., when flip flop 66 is toggled to its set state, the $N_P$ Counter 24 and the $N_T$ Counter 30 are enabled. That is, the output of flip flop 66 functions as a count enable (CE) signal for the $N_P$ and $N_T$ Counters. As thus described, it is seen that the decade counter 76, in conjunction with the flip flops 65–68, functions as a time sequencer so as to provide selectible, precision time intervals between the application of a high anode voltage to the GMT and the enabling of the counters 24 and 30. This precision time is referred to herein as the wait time, $T_W$.

Referring next to FIG. 3C, the logic schematic diagram of the $N_P$ and $N_T$ counters 24 and 30 is shown. The trial counter, or $N_T$ Counter 30, is realized with a first 8-bit counter 84 and a second 8-bit counter 86. The counter 86 is configured to catch the overflow (or "carry") from the counter 84. Thus, the two counters 84 and 86 function together as a 16-bit trial counter. The pulse counter, or $N_P$ Counter 24, is similarly realized with an 8-bit counter 88. Advantageously, the counters 84, 86, and 88 may all be the same type of MSI integrated circuit, such as the 54HC590 8-bit Binary Counter with Output Registers, available commercially from numerous IC vendors. Because each has its own output register, all may share the same data bus 90, which data bus 90 couples the count data maintained in each counter to the processing circuitry 32 (FIG. 2).

As further seen in FIG. 3C, a suitable decoder/demultiplexer circuit 92 is coupled to the counters 84, 86 and 88. This decoder/demux circuit 92 allows the processing circuitry 32 to specify which of the maintained counts is being selected for transfer to the data bus 90. Further, as indicated in FIG. 3C, an additional flip flop 94 has its clock input connected to the overflow of counter 86. Thus, when the trial counter 86 is full, the flip flop 94 is toggled. Such toggling signals the processing means of this condition and provides for the automatic transfer of the $N_P$ count to the processor, followed by the automatic resetting of the counters 84, 86 and 88, as well as the resetting of the decade counter 76 and the flip flops 65-68. This latter function (of resetting the dwell time control circuitry 22) is achieved via the signal line 96 which couples the data output of flip flop 94 to the reset line 98 (FIG. 3B) of the dwell time control circuitry 22.

Figure 4:
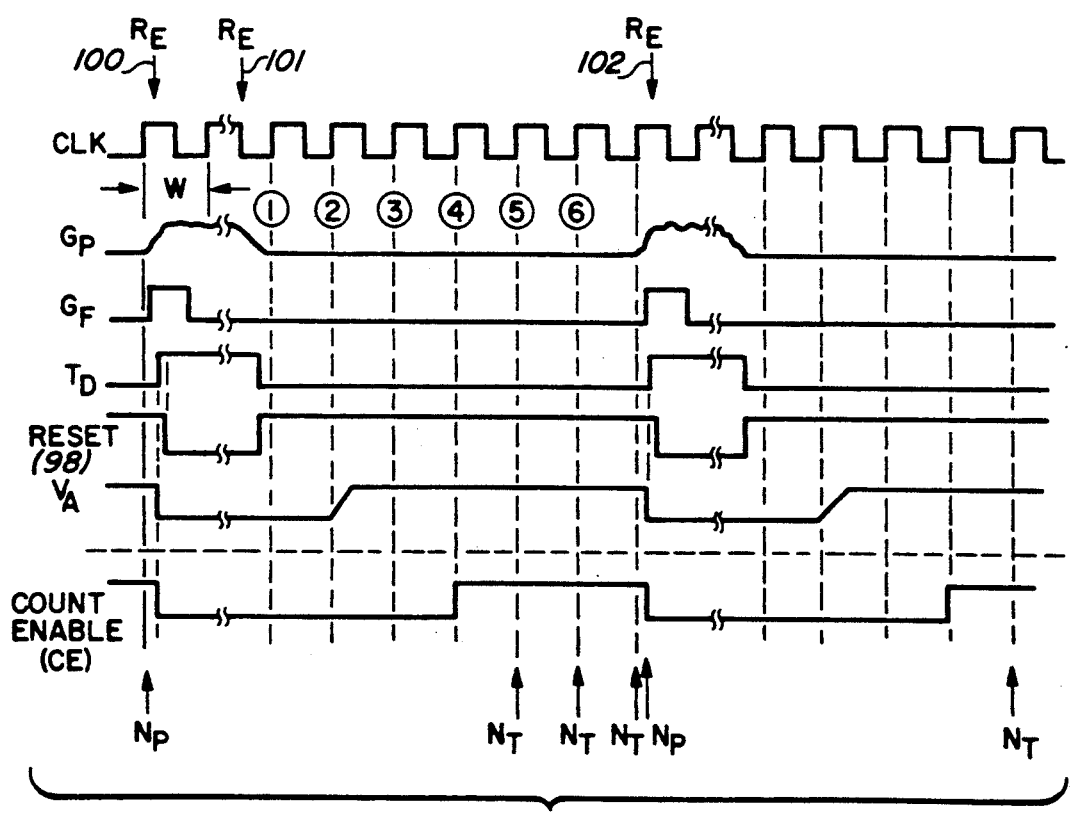
FIG. 4 is a timing diagram depicting the basic operation of the circuits of FIGS. 2 and 3A-3C.

FIG. 4 illustrates a timing diagram depicting the basic operation of the circuits of FIGS. 2 and 3A-3C. This basic operation will next be described with reference to the signals shown in FIG. 4. Included in FIG. 4 is a representation of the clock signal, CLK, having a period W. In response to the receipt of radiation energy, $R_E$, (received at a time represented by the arrow 100), a Geiger pulse $G_P$ is generated. This pulse $G_P$ turns on transistor Q1 in the GMT trigger circuit 20, which in turn causes the Geiger trigger pulse $G_T$ to be generated. The width of the pulse $G_T$ is quite narrow, but not critical, being largely controlled by the propagation delay times through logic gates 65 and 78 (coupled to the input and output, respectively, of the one shot 64). The occurrence of the Geiger trigger pulse $G_T$ triggers the one shot 64, causing the dwell pulse $T_D$ to be generated. This pulse $T_D$, after passing through logic gate 78, becomes the RESET pulse 98 that resets the flip flops 65-68 and the time sequencer decade counter 76. As long as the RESET pulse 98 remains low, the flip flops 65-69 and the decade counter 76 are disabled (i.e., they cannot toggle or count, and they are forced to their respective reset states.

After the RESET pulse 98 goes high, the decade counter 76 is enabled and counts each period of the clock signal CLK. By way of illustration, the first six counts (positive transitions) of the clock signal CLK after the reset pulse 98 goes high are labeled in FIG. 4 with the count numbers 1 through 6 being circled. Upon the first rising edge of the CLK signal after being thus enabled, the first count occurs. This event clocks flip flop 67. At the next clock signal, count 2, flip flop 68 is clocked causing the control signal T1/T2 to switch the anode voltage $V_A$ back to its operating value.

After the third clock signal, the sequencer (decade counter) 76 clocks flip flop 65. Hence, at the next clock signal, count 4, flip flop 66 is clocked to its set state, thereby enabling the $N_T$ and $N_P$ counters 30 and 24. That is, the output signal from flip flop 66 functions as a Count Enable (CE) signal directed to the counters 30 and 24. Once enabled, the trial counter 30 counts each clock period. Thus, as shown in the example of FIG. 4, at the occurrence of the fifth clock cycle, labeled with the number 5 in a circle, the trial counter 30 is incremented one count. This incrementing is represented in FIG. 4 as the first small arrow $N_T$ (below the CE signal). Subsequent cycles of the CLK signal that cause the trial counter to increment are represented as additional arrows labeled $N_T$. For the example shown in FIG. 4, there are three CLK cycles that are counted while the trial counter is enabled.

Still referring to FIG. 4, after the third trial period is counted, additional radiation energy, $R_E$, is detected, represented by the arrow 102. Detection of this energy causes the GMT to generate the Geiger pulse $G_P$, and the process repeats as described above.

It should be noted that at the occurrence of each Geiger trigger pulse, $G_T$, the $N_P$ Counter 24 is incremented providing it is enabled. Thus, for the example shown in FIG. 4, the $N_P$ Counter 24 is incremented once upon the occurrence of the first radiation energy $R_E$ (represented by the arrow 100), and once upon the occurrence of the third radiation energy $R_E$ (represented by the arrow 102). These counts are represented in FIG. 4 by the arrows $N_P$ below the CE signal. The $N_P$ Counter is not enabled at the time a second radiation energy $R_E$ pulse (represented by the arrow 101) occurs, and hence the $N_P$ counter is not incremented. Moreover, as shown in FIG. 4, the $R_E$ energy 101 occurs at a time when the GMT 12 has not cleared its charge from the prior detected energy associated with $R_E$ energy 100, and hence is not detectable by the GMT.

It is to be emphasized that the time sequencer 76 may advantageously be set to clock flip flops 65 and 67 after any desired number of clock periods W once the sequencer has been enabled. The values used in the above example, of clocking flip flop 67 after the first clock period, and clocking flip flop 65 after the third clock period, are only exemplary.

The circuitry described above in connection with FIGS. 2-4 illustrate just one manner in which hardware may be used to monitor and measure radiation dosage using a single GMT in accordance with the improved reciprocal rate measurement method of the present invention. The use of dedicated hardware circuitry to achieve this function offers several advantages, including freeing up the processing circuitry 32 (FIG. 2) to perform other tasks. However, it is to be understood that many of the operations performed by the circuitry of FIGS. 2-4 could also be performed using a suitable processor, e.g. a microprocessor, controlled by either software and/or firmware.

FIG. 5 illustrates a flow chart that shows one manner in which suitable processing circuitry, e.g., the processor 32 of FIG. 2, may carry out and control the reciprocal rate measurement method of the present invention. In carrying out such method, it is assumed that a single GMT is available, including whatever hardware circuitry is needed to operate such GMT, and that suitable counters are available, either in hardware or emulated in software, to perform the counting function of the $N_P$ and $N_T$ counters as previously described.

A first step of the process shown in FIG. 5, as indicated in block 120 of the flow chart, is to set appropriate initial conditions. These initial conditions include resetting the $N_P$ and $N_T$ counters, raising the anode voltage $V_A$ to 100% of its operating value, and setting appropriate values for the various time periods that are used in carrying out the method. These time periods include the dwell time $T_D$, the clock cycle time W, and the number of clock cycle times, $W_A$, that must elapse subsequent to the dwell time prior to raising the anode voltage $V_A$ back to its operating value, and the number of clock cycle times, $W_B$, that must elapse subsequent to the dwell time prior to enabling the $N_P$ and $N_T$ Counters.

Once the initial conditions are set, the GMT is monitored for the occurrence of a Geiger pulse $G_P$, as shown in block 122 of the flow chart. (The block reference numerals associated with the flow chart in FIG. 5 are hereafter placed in parenthesis.) If a Geiger pulse is detected (124), then the $N_P$ Counter is incremented (126). At the same time that the $N_P$ Counter is incremented (126), a $T_D$ timer is started (128), the anode voltage $V_A$ is lowered to 50% (or other appropriate value) of its operating value (130), and the $N_T$ and $N_P$ Counters are disabled (132). Further, concurrent with (or immediately subsequent to) the disabling of the $N_T$ and $N_P$ Counters, a timing sequencer (used to monitor or count the number of clock periods W that elapse) is reset to a zero (or other reference) count.

Upon the timing out of the $T_D$ timer (136), the timing sequencer begins to count the clock periods $W_n$, n=1, 2, 3, . . .. When the count $W_n$ equals the programmed count $W_A$ (140), the anode voltage $V_A$ of the GMT is raised back to 100% of its operating value (142). When the count $W_N$ equals the programmed count $W_B$ (144), the $N_T$ and $N_P$ Counters are enabled. Once these counters are enabled, each period W of the clock signal is counted in the $N_T$ counter (148). At any time during this next clock period, an interrupt signal may occur (150) to stop the process. Further, a decision is made as to whether the $N_T$ Counter is full (152). If not, the GMT is monitored to determine if a $G_P$ pulse occurs during the clock period (154). If not, the $N_T$ counter is again incremented at the conclusion of the period W, and the process repeats. If so, that is if a $G_P$ pulse occurs, then the $N_P$ Counter is incremented (126), the $T_D$ timer is incremented (128), the anode voltage is lowered (130), the $N_T$ and $N_P$ counters are disabled (132), and the time sequencer is reset (134) as described above. Should the $N_T$ counter be full (152), then $R_g$ is calculated as set forth above in Equation 6 (158). This value of $R_g$ is then displayed and/or stored (160), the $N_T$ and $N_P$ counters are reset (162), and the process repeats.

In one embodiment of the invention, apparatus performing the ERG counting method of the present invention is realized using a commercial microprocessor board with a member of the INTEL 80C51 family of microcontrollers, and a crystal oscillator 28 operating at 16 MHz. This family of microcontrollers advantageously provides an RS-232 interface that enables a portable personal computer (PC) to be used for data acquisition. In such embodiment, all integrated circuits used in the apparatus, e.g., for the decade counter 76, the $N_T$ and $N_P$ counters 30 and 24, etc., may be members of the CMOS 74HCXXxx family which operate at frequencies up to 25 Mhz and which draw nominal quiescent currents of 2 to 10 $\mu$A each. The total quiescent current demand for such embodiment is on the order of 150 $\mu$A. However, when the 16 MHz crystal oscillator is enabled, current demand jumps to about 25 mA. Hence, in order to minimize power consumption, the preferred approach for making the apparatus span an 8 decade range is to perform conventional pulse counting with dead time correction over the lower decades, and then switch to ERG counting for the upper decades. The preferred transition from conventional pulse counting to ERG counting may occur between 25 mR/h and 1 R/h.

Figure 6:
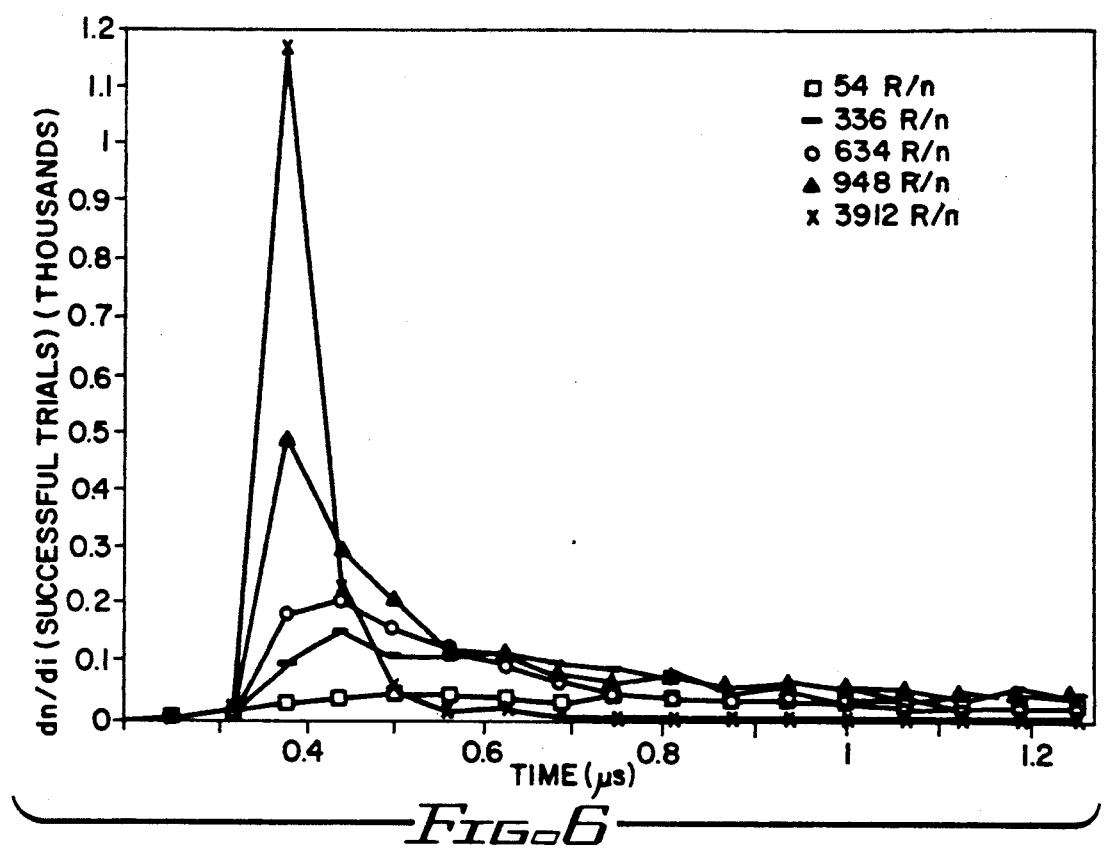
FIG. 6 is a graph showing radiation data measured using the measurement method and apparatus of the present invention.

Data obtained using an ERG counting apparatus as described above in FIGS. 3A-3C is plotted in FIG. 6. The data shown in FIG. 6 was obtained by placing the apparatus in a $^{60}$Co exposure-room facility. To obtain this data, the clock signal of flip flop 94 was disconnected from the 8-bit counter 86, and connected to the output of the one shot 64. In this way, each Geiger pulse disabled the system, thereby allowing an $N_T$-value to be associated with each Geiger pulse. The resulting time distributions, as indicated in FIG. 6, show that the initial selection of "3" clock periods for the time sequencer 76 before enabling the $N_T$ counter was overly optimistic because no data were obtained for $N_T$ values less than 6 (i.e., in less than $6/f_{osc}=375$ nsec). This is believed to be due mostly to delays in the high voltage switching section. However, the data also show excellent measurement sensitivity up to dose rates of 4000 R/h, which rate corresponds to a photon interaction rate of about $2.2 \times 10^7$ s$^{-1}$ for the GMT that was used (a Xeram GMT). That is, 4000 R/h produced the same interaction rate that would be obtained with a 25 cps/(mR/h) tube in a field of 720 R/h.

Figure 7:
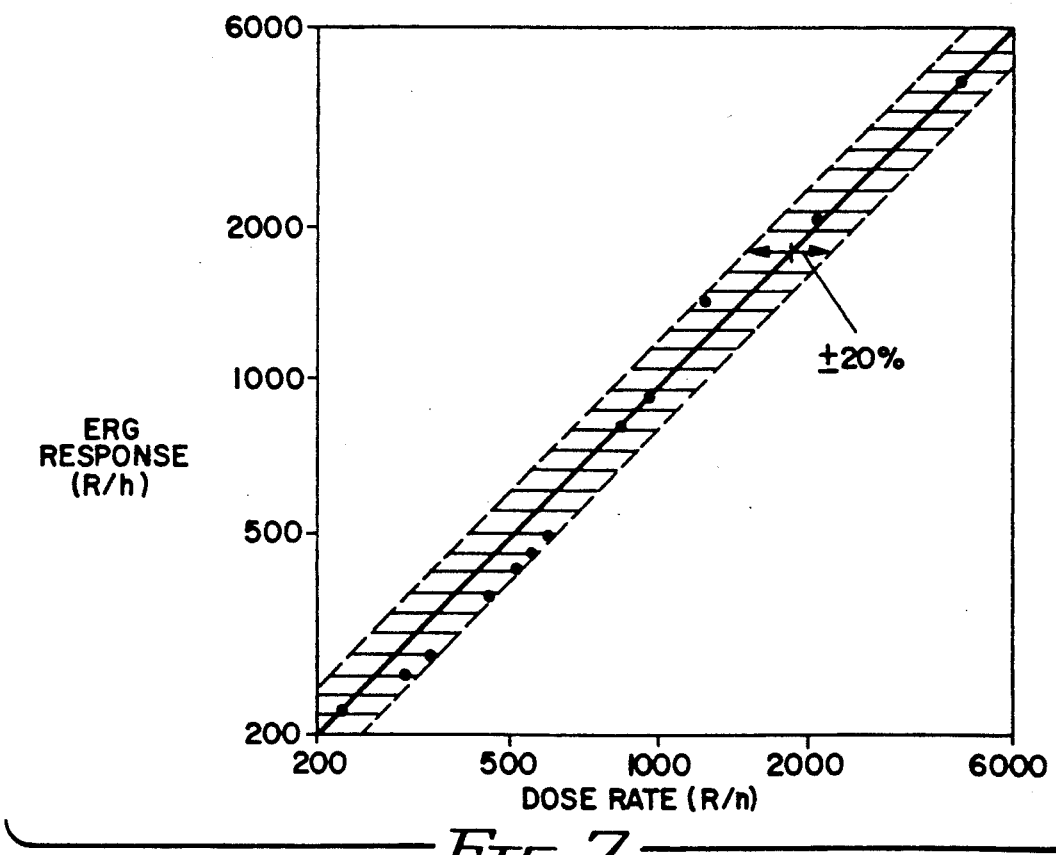
FIG. 7 is a graph comparing the radiation measurement apparatus of the invention with conventional radiation measuring devices.

Referring next to FIG. 7, there is shown a graph depicting the results obtained by measuring controlled radiation dosages using both the apparatus as shown above in FIGS. 3A-3C (vertical axis) and a commercial wide-range ratemeter (horizontal axis). Dose rates below 500 R/h were obtained off the beam axis near a rear wall of the exposure room. A ±20% error zone is indicated for the abscissa due to the resulting large field density gradients and a 2.5 inch separation distance between the ERG GMT and the sensitive volume of the commercial instrument. ERG response values were computed using Equation (6) with S=4.5 cps/(mR/h) and using only data for which $N_T$ was 7 or greater. That is, $N_T$-values for Equation (6) were obtained as $N_T = N_T - 6$. In so doing, all trial periods during which the GMT was insensitive, as well as the first sensitive trial period, were eliminated. The exclusion of the first sensitive trial period is preferred because during this time there may be Geiger pulses resulting from photon interactions which may have occurred within an electron collection time (0.1 to 1 $\mu$s) of the end of the GMT's recovery period. It is noted that performance of these steps may optionally be incorporated in the hardware of the apparatus, in which case they would be totally transparent to both the CPU (processor 32) and the user.

It is further noted that implementation of the ERG measuring apparatus of the present invention may be somewhat simpler than the circuitry shown in FIGS. 3A-3C. For instance, the maximum rate of increase for $N_P$ is about 4 to 5 kHz (with the reciprocal recovery time being set by the one shot 64). Since conventional CPU counters of the type found in most commercial processors, such as a PC, may easily count at these rates, there is actually no need for the counter 88. (This counting function may be performed in the CPU.) Similarly, the PC can readily be programmed to control the recovery period so as to provide crystal-accurate dwell times for the dead time correction. Hence, the one shot 64 may also be eliminated. The dose rates over the lower decades may then be obtained from the conventionally measured count rate, C, as $$R_g = C/[(1-C.T_r).S] \quad (7)$$

where $T_r$ is the recovery time of the GMT.

Thus, in one embodiment of the invention it is preferred that conventional counting be combined with ERG counting in a single apparatus. Such combination advantageously allows more than the desired 8-decade range to be achieved. The sensitivity of the GMT used in such combined apparatus (using both conventional and ERG counting) may be selected to provide better time response and statistical accuracy over the lower decades. Further, design optimization may be used to minimize the number of logic gates that continuously follow the high frequency clock in order to reduce current requirements in the ERG mode to 15–20 mA. Such combined apparatus may be realized as shown in FIG. 2 where a mode control circuit 36 interfaces with the processing circuitry 36 in order to control how the processing circuitry 32 computes the dose rate. The dose rate may be computed either as set forth in Equation (6), ERG counting, or as set forth in Equation (7), conventional counting, based on the count rate held, e.g., in the $N_P$ Counter. Alternatively, the apparatus may include a manual range switch (as is quite common in electrical instrumentation apparatus), and the manual placement of the range switch to a desired dose range would control the type of counting—conventional or ERG—that is performed by the processing circuitry 32.

As seen from the above description, the present invention thus provides a radiation measurement method that extends the useful geiger range of a Geiger-Mueller tube (GMT). Further, it is seen that the apparatus and method of the present invention, while utilizing an approach similar to the reciprocal rate measurement approach of the prior art (thereby providing a system that incorporates the advantages of such approach), advantageously removes the time uncertainties associated with the beginning of a measurement interval (thereby eliminating the main disadvantage of such prior art approach).

As also seen from the above description, the radiation measurement apparatus and method of the present invention utilize only a single GMT. As a result, the amount of circuitry and the complexity of the circuitry is greatly simplified over that required in prior art apparatus utilizing multiple GMT's. Further, the reduced circuit complexity and fewer circuit components allow apparatus made in accordance with the invention to be more reliable, less costly, consume less power, and be packaged smaller, than has heretofore been possible. Hence, radiation measurement apparatus is provided that may be small, light weight, and portable. Such apparatus accurately detects radiation dosage rates over a wide range, e.g., from background rates (e.g., 20 μR/h or less) to 1000 R/h, using a single GMT. In at least one embodiment of the invention, such apparatus may selectively and/or automatically operate in either a conventional reciprocal rate measurement mode or an extended range geiger (ERG) measurement mode.

While the invention herein disclosed has been described by means of specific embodiments and applications thereof, numerous modifications and variations could be made thereto by those skilled in the art without departing from the scope of the invention set forth in the claims.

What is claimed is:

1. A method of measuring radiation using a Geiger Muller tube (GMT), said GMT being characterized by generating a GMT-pulse in response to the detection of a charged particle, and by having a prescribed high anode voltage that must be applied thereto prior to being able to detect a charged particle, and a recovery period that must elapse after detecting a charged particle before a subsequent charged particle can be detected, said method comprising the steps of:

defining a first time period greater than said recovery period, said first time period commencing immediately subsequent to the detection of a charged particle by said GMT;

counting all of the GMT-pulses generated by said GMT except those occurring during said first time period;

defining a basic time interval utilizing an oscillator having a fixed period, $T_W$, the frequency of the oscillator $f_{osc}$ thereby being equal to $1/T_W$;

counting all of the basic time intervals that occur subsequent to said first time period and prior to the detection of the next charged particle by said GMT; and statistically determining a measure of the number of charged particles detected by said GMT as a function of the cumulative GMT-pulse count and the cumulative basic time interval count wherein the GMT-pulse count may be represented as a number $N_P$, and the basic time interval count may be represented as a number, $N_T$, and wherein said GMT is characterized by a sensitivity factor, S, that defines the radiation counts per second (cps) emitted by the GMT for a specific radiation exposure of the GMT, and further wherein the step of statistically determining a measure of the number of charged particles detected by said GMT, $R_g$, comprises computing $R_g$ from the relationship:

$$R_g = f_{osc}.ln[N_T/(N_T-N_P)]/S.$$

2. The radiation measurement method as set forth in claim 1 further including:

lowering the high anode voltage to a first value substantially less than said prescribed high anode voltage in response to the detection of a charged particle within said GMT; and raising the high anode voltage to said prescribed high anode voltage only after a time period in excess of said recovery period has elapsed.

3. The radiation measurement method as set forth in claim 1 wherein the step of defining said first time period comprises synchronously defining said first time period to be a fixed period of time plus a portion of a clock cycle period.

4. The radiation measurement method as set forth in claim 1 wherein the step of defining said first time period comprises triggering a fixed interval timer with said GMT-pulse.

5. A method of effectively extending the dynamic count range of radiation measurement apparatus utilizing a single Geiger-Mueller tube (GMT) to enable the GMT to detect radiation count rates in excess of count rates limited by a recovery time of said GMT, said recovery time comprising the time it takes a charged particle to clear said GMT once said charged particle has been detected, said method comprising the steps of:
(a) incrementing a first counter upon the detection of a charged particle by said GMT;
(b) waiting a first prescribed period of time subsequent to the detection of a charged particle in step (a), said first prescribed period of time being greater than said recovery time;
(c) incrementing a second counter at each conclusion of a second prescribed period of time within a sequence of the second prescribed periods of time, said sequence commencing at each conclusion of said first prescribed period of time and concluding at the detection of a subsequent charged particle by said GMT; and
(d) statistically determining the radiation count, wherein said radiation count is $R_g$, to which said GMT has been exposed as a function of the count held in said first counter, $N_P$, and the count held in said second counter, $N_T$, comprising computing $R_g$ from the relationship:

$$R_g = f_{osc} \ln[N_T/(N_T - N_P)]/S$$

where S is the sensitivity of said GMT, and wherein $f_{osc}$ is equal to $1/T_W$, wherein $T_W$ is a fixed period equal to the second prescribed period of time;
wherein the steps of incrementing said first and second counters include not incrementing said first and second counters during said first prescribed period of time.

6. A method of operating radiation measurement apparatus having a single Geiger-Mueller tube (GMT) comprising:
(a) establishing specified initial conditions of said GMT, whereby said GMT is enabled to detect a charged particle, including establishing a first prescribed anode voltage for said GMT, said first prescribed anode voltage being less than an operating voltage of said GMT, and establishing a second prescribed anode voltage after a dwell time period subsequent to detecting a charged particle by said GMT, said second anode voltage being at least equal to said operating voltage;
(b) generating detection and elapsed time data indicative of the detection of a charged particle by said GMT and the time interval between enabling said GMT and the detection of the charged particle by said GMT, comprising:
detecting the charged particle entering said GMT, triggering the beginning of said dwell time period upon the detection of the charged particle by said GMT, and
generating a prescribed clock signal having a period;
(c) discarding a first portion of the detection and elapsed time data, said first portion of data including at least that portion of the data during which the initial conditions associated with said GMT are uncertain, including
not counting the number of periods of the prescribed clock signal during said dwell time period, and
not counting the number of periods of the prescribed clock signal until a prescribed number of the clock periods have elapsed after the termination of said dwell period; and
(d) processing a second portion of said detection and elapsed time data to determine the radiation dosage rate to which said GMT has been exposed, said second portion of data not including said first portion of data; and
(e) repeating steps (a) through (d) for each charged particle detected by said GMT.

7. A method of measuring radiation to which a single Geiger-Mueller tube (GMT) is exposed over a wide range of radiation dosage rates, from low radiation dosage rates where a small number of charged radiation particles are present per unit of time, to high radiation dosage rates where a large number of charged radiation particles are present per unit of time, said GMT producing an electrical pulse upon the detection of each charged radiation particle, said GMT exhibiting a recovery time, said recovery time comprising the time it takes a charged radiation particle to clear said GMT once said charged particle has been detected, said radiation measuring method comprising:
applying an anode voltage of a first prescribed value to said GMT, the anode voltage of said first prescribed value enabling said GMT to detect a charged radiation particle and produce said electrical pulse;
generating a clock signal having a fixed clock period, said fixed clock period repeating in a recurring cycle;
incrementing a first counter when enabled in response to an electrical pulse produced by said GMT, whereby a count value is maintained in said first counter corresponding to the number of electrical pulses produced by said GMT during the time that said first counter is enabled;
triggering a prescribed dwell period in response to an electrical pulse produced by said GMT;
lowering the anode voltage below said first prescribed value in response to an electrical pulse produced by said GMT;
raising the anode voltage to said first prescribed value in response to the elapse of a first number of said fixed clock periods subsequent to the conclusion of said prescribed dwell period, whereby said GMT is enabled to detect a charged radiation particle at the conclusion of a first time period comprising said dwell period plus said first number of fixed clock periods;
disabling said first counter and a second counter during a second time period comprising said dwell period plus a second number of said fixed clock periods;
incrementing said second counter when enabled at the conclusion of each of said recurring clock periods, whereby a count value is maintained in said second counter corresponding to the number of said fixed clock periods that elapse during the time that said second counter is enabled; and
computing the radiation dosage rate to which said GMT has been exposed as a function of the count values maintained in said first and second counters.

8. The radiation measurement method as set forth in claim 7 wherein the fixed clock period of said clock signal comprises a period falling within the range of 40 to 70 nanoseconds.

9. The radiation measurement method as set forth in claim 8 wherein the first number of said fixed clock periods that elapse subsequent to the termination of the prescribed dwell period and prior to raising of said anode voltage to said first prescribed value is one.

10. The radiation measurement method as set forth in claim 8 wherein the second number of said fixed clock periods that elapse subsequent to the termination of the prescribed dwell period and during which said first and second counters are disabled comprises a number within the range of three to ten.

11. The radiation measurement method as set forth in claim 8 wherein said prescribed dwell period comprises a fixed period of time within the range of 10 to 30 microseconds.

12. The radiation measurement method as set forth in claim 7 wherein the step of computing the radiation dosage rate comprises computing $$R_g = f_{osc} \cdot ln[N_t/(N_T - N_P)]/S$$

wherein $R_g$ is the radiation dosage rate, $f_{osc}$ is the frequency of clock signal, $N_P$ is the count value maintained in the first counter, $N_T$ is the count value maintained in the second counter, and S is the sensitivity of said GMT.

13. The radiation measurement method as set forth in claim 12 wherein the step of computing the radiation dosage rate further includes computing $$R_g = C/[1 - C \cdot T_r) \cdot S]$$

for dosage rates spanning from background rates to 1 R/h, where C is the count value maintained in the first counter, $T_r$ is the recovery time of the GMT, and S is the sensitivity of the GMT.

14. Radiation measurement apparatus comprising:
a single Geiger-Mueller tube (GMT);
initial condition means for establishing specified initial conditions of said GMT, whereby said GMT is enabled to detect a charged particle, comprising:
anode voltage switching means for switchably altering an anode voltage applied to said GMT between two values, including trigger means responsive to the detection of a charged particle by said GMT that automatically lowers the anode voltage to said second value, and time means for maintaining said anode voltage at said second value for a prescribed dwell time period,
a first anode voltage value having a magnitude that enables said GMT to detect a charged particle, and
a second anode voltage value having a magnitude that disables said GMT from detecting a charged particle;
measurement means for measuring detection and elapsed time data indicative of the number of charged particles detected by said GMT and the time interval between enabling said GMT and the detection of a given charged particle by said GMT, including:
first counting means responsive to said trigger means for counting the number of charged particles detected by said GMT,
clock generating means for generating a clock signal having a fixed period, and
second counting means coupled to said clock generating means for counting the number of said fixed periods of said clock signal that elapse while said second counting means is enabled;
discarding means for discarding a first portion of the detection and elapsed time data, said first portion of data including at least that portion of the data during which the initial conditions associated with said GMT are uncertain, including
time sequencer means for disabling said first and second counting means during said prescribed dwell time period, and for disabling said first and second counting means during a first prescribed wait period;
the detection and elapsed time data occurring during said first prescribed wait period corresponding to said first portion of data; and
processing means for processing a second portion of said detection and elapsed time data to determine the radiation dosage rate to which said GMT has been exposed, said second portion of data comprising the detection and elapsed time data occurring when said first and second counting means are enabled.

15. The radiation measurement apparatus as set forth in claim 14 wherein said time sequencer means further disables said first counting means for a second prescribed wait period subsequent to said dwell time period.

16. The radiation measurement apparatus as set forth in claim 15 wherein said first and second prescribed wait periods are defined in terms of first and second integer numbers of the fixed period of said clock signal, respectively.

17. The radiation measurement apparatus as set forth in claim 16 wherein said processing means includes means for determining the radiation dosage to which said GMT has been exposed as a function of the detection and elapsed time data held in said first and second counting means.

18. The radiation measurement apparatus as set forth in claim 17 wherein the radiation dosage is determined from the relationship $$R_g = f_{osc} \cdot ln[N_T/(N_T - N_P)]/S$$

where $R_g$ is the radiation dosage rate, $f_{osc}$ is the frequency of clock signal, $N_P$ is the count value maintained in the first counting means, $N_T$ is the count value maintained in the second counting means, and S is the sensitivity of said GMT.

19. Radiation measurement apparatus comprising:
a single Geiger-Mueller tube (GMT), said GMT producing an electrical pulse upon the detection of a charged radiation particle, said GMT exhibiting a recovery time, said recovery time comprising the time it takes a charged radiation particle to clear said GMT once said charged particle has been detected;
voltage control means for applying a voltage of a first prescribed value to said GMT in response to a first timing signal, and for applying a voltage of a value less than said first prescribed value to said GMT in response to a second timing signal, a voltage of said first prescribed value enabling said GMT to detect a charged radiation particle and produce said electrical pulse, and a voltage of a value less than said first prescribed value disabling said GMT;
oscillator means for generating a clock signal having a fixed clock period, said fixed clock period repeating in a recurring cycle;
first counter means coupled to said GMT for maintaining a count of the number of electrical pulses produced by said GMT when enabled by a first enabling signal;

second counter means coupled to said GMT for maintaining a count of the number of specified clock transitions that occur within said clock signal when enabled by a second enabling signal;

dwell means coupled to said GMT for generating said second timing signal and for triggering a prescribed dwell period in response to an electrical pulse produced by said GMT;

time sequencer means responsive to said dwell period and said clock signal for generating said first timing signal and said first and second enabling signals, said time sequencer means being disabled during said dwell period, said first timing signal being generated a prescribed number of specified clock transitions subsequent to said dwell period, and said first and second enabling signals being generated an assigned number of specified clock transitions subsequent to said dwell period; and processing means coupled to said first and second counter means for computing the radiation dosage rate to which said GMT has been exposed as a function of the respective counts maintained within said first and second counters.

20. The radiation measurement apparatus as set forth in claim 18 wherein said processing means computes the radiation dosage rate in accordance with the relationship $$R_g = f_{osc} \cdot \ln[N_T/(N_T - N_P)]/S$$

where $R_g$ is the radiation dosage rate, $f_{osc}$ is the frequency of clock signal, $N_P$ is the count value maintained in the first counting means, $N_T$ is the count value maintained in the second counting means, and S is the sensitivity of said GMT.

21. The radiation measurement apparatus as set forth in claim 20 wherein said processing means further computes the radiation dosage rate in accordance with the relationship $$R_g = N_P/[1 - N_P T_r) \cdot S]$$

for dosage rates in the range of 25 mR/h to 1 R/h, where $N_P$ is the count value maintained in the first counting means, $T_r$ is the recovery time of the GMT, and S is the sensitivity of the GMT; and wherein said processing means continues to compute the radiation dosage rate as set forth in claim 25 for dosage rates greater than 1 R/h.

22. The radiation measurement apparatus as set forth in claim 20 wherein said processing means automatically computes the radiation dosage rate whenever the value of $N_P$ maintained in the first counting means reaches a set value.

23. The radiation measurement apparatus as set forth in claim 22 wherein the set value of $N_P$ at which the processing means automatically computes the radiation dosage rate comprises a maximum count of said first counting means.

24. The radiation measurement apparatus as set forth in claim 19 wherein said prescribed dwell period comprises a fixed period of time of at least 40 microseconds.

25. The radiation measurement apparatus as set forth in claim 24 wherein the fixed clock period of said clock signal is within the range of 40–70 nanoseconds, whereby the frequency of the clock signal is within the range of 14.3 MHz to 25 MHz.

26. A method for controlling the operation of a Geiger-Mueller tube (GMT), said GMT being characterized by generating a GMT-pulse in response to the detection of a charged particle, and by having a prescribed high anode voltage that must be applied to the GMT prior to being able to detect a charged particle, and a recovery period that must elapse after detecting a charged particle before a subsequent charged particle can be detected, said method comprising the steps of:

(a) applying a first anode voltage to said GMT, said first anode voltage having a magnitude that disables said GMT from detecting a charged particle;

(b) waiting a first period of time subsequent to the application of the first anode voltage in step (a), said first period of time being greater than said recovery time;

(c) applying a second anode voltage to said GMT at the conclusion of said first period of time, said second anode voltage having a magnitude at least equal to said prescribed high anode voltage;

(d) waiting a second period of time subsequent to the application of the second anode voltage in step (c), said second period of time being sufficiently long to establish specified initial conditions on said GMT so as to ensure that the GMT is enabled to detect a charged particle;

(e) incrementing a first counter after the conclusion of said second period of time for each basic time interval that elapses prior to the detection of a charged particle by said GMT, said first counter thereby having a count, $N_T$, maintained therein;

(f) incrementing a second counter after the conclusion of said second period of time for each charged particle detecting by said GMT, said second counter thereby having a count, $N_P$, maintained therein;

(g) repeating steps (a) through (f) for each charged particle detected by said GMT, thereby controlling when said GMT is allowed to detect charged particles; and (h) statistically determining the radiation count, $R_g$, to which said GMT has been exposed as a function of the count held in said first counter, $N_T$, and the count held in said second counter, $N_P$, after a sufficient number of counts have accumulated in both counters.

27. The method for controlling the operation of a Geiger-Mueller tube (GMT) in claim 26, wherein said statistical determination comprises computing $R_g$ from the following relationship:

$$R_g = \frac{f_{osc} \times \ln\left[\frac{N_T}{N_T - N_P}\right]}{S}$$

where S is the sensitivity of said GMT and where $f_{osc}$ is equal to $1T_W$, wherein $T_W$ is of said basic time interval.

* * * * *

UNITED STATES PATENT AND TRADEMARK OFFICE
CERTIFICATE OF CORRECTION

PATENT NO. : 5,206,513

DATED : April 27, 1993

INVENTOR(S) : Kenneth H. Valentine, et al

Page 1 of 2

It is certified that error appears in the above-identified patent and that said Letters Patent is hereby corrected as shown below:

Abstract, item [57], line 3, after "in", delete "a"
Column 1, line 17, column 4, line 27; and Column 18, line 5 (Claim 1): change "Muller" to --Mueller--. Column 2, line 64, change "$10^{-7}$" to --$10^7$--. Column 5, line 54, delete "a". Column 6, line 26, change "discritized to --discretized--. Column 5, line 65, change "$1/T_{ave}$)." to --$1/T_{ave}$.)--. Column 9, line 9; column 9, line 16 column 18, line 43 (Claim 1); column 19, line 23 (Claim 5); column 21, line 15 (Claim 12); column 22, line 38 (Claim 18); and column 23, line 29 (Claim 20): change "$f_{osc}$ ln" to --$f_{osc} \cdot \ln$--. Column 13, line 41, after "$R_f$", delete the comma (,). Column 13, line 55, change "65-69" to --65-68--. Column 14, line 43, change "67" to --65--. Column 14, line 44, change "65" to --67--. Column 15, line 30, column 15, line 34, change "$W_N$" to --$W_n$--. Column 15, line 50, change "Equation 6" to --Equation (6)--. Column 15, line 65, change "Mhz" to --MHz-- Column 17, line 7 (Equation 7), change "$R_s=C/[1-C \cdot T_r) \cdot S](7)$" to --$R_s=C/[1-C \cdot T_r) \cdot S]$    (7)--. Column 17, line 57, change "light weight" to --lightweight--. IN THE CLAIMS: Column 21, line 17, Claim 12, change "wherein" to --where--. Column 21, line 26, Claim 13, change "...$C \cdot T_r) \cdot S]$" to --...$C \cdot T_r) \cdot S]$--. Column 21, line 42, Claim 14, Change "time" to --timer--. Column 23, line 25, Claim 20, change "18" to --19--. Column 2 line 40, Claim 21, change "...$N_p \cdot T_r) \cdot S]$" to --...$N_p \cdot T_r) \cdot S]$--. Column 23, line 48, Claim 21, change "25" to --20--.

UNITED STATES PATENT AND TRADEMARK OFFICE
CERTIFICATE OF CORRECTION

PATENT NO. : 5,206,513
DATED : April 27, 1993
INVENTOR(S) : Kenneth H. Valentine, et al It is certified that error appears in the above-indentified patent and that said Letters Patent is hereby corrected as shown below:

Column 24, line 38, claim 26, change "detecting" to --detected--.

Signed and Sealed this

First Day of March, 1994

Attest:

BRUCE LEHMAN

Attesting Officer

Commissioner of Patents and Trademarks